United States Patent
Bialer et al.

(10) Patent No.: US 11,313,944 B2
(45) Date of Patent: Apr. 26, 2022

(54) HORIZONTAL AND VERTICAL POLARIZATION BEAMFORMING IN A RADAR SYSTEM

(71) Applicant: GM Global Technology Operations LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 306 days.

(21) Appl. No.: 16/415,253

(22) Filed: May 17, 2019

(65) Prior Publication Data

US 2020/0363497 A1 Nov. 19, 2020

(51) Int. Cl.
| | | |
|---|---|---|
| *G01S 7/02* | (2006.01) | |
| *G01S 13/04* | (2006.01) | |
| *G01S 13/931* | (2020.01) | |
| *H01Q 15/24* | (2006.01) | |

(52) U.S. Cl.
CPC .............. *G01S 7/025* (2013.01); *G01S 13/04* (2013.01); *G01S 13/931* (2013.01); *H01Q 15/24* (2013.01)

(58) Field of Classification Search
CPC ........ G01S 13/04; G01S 13/931; G01S 7/025; H01Q 15/24
See application file for complete search history.

(56) References Cited

U.S. PATENT DOCUMENTS

| | | | |
|---|---|---|---|
| 2007/0222660 A1* | 9/2007 | Stagliano, Jr. .......... | G01S 7/285 342/26 R |
| 2009/0262011 A1* | 10/2009 | Calderbank ........... | G01S 13/284 342/188 |
| 2011/0285571 A1* | 11/2011 | Jeong ................... | H01Q 21/065 342/27 |
| 2015/0123838 A1* | 5/2015 | Shi ...................... | H01Q 21/0075 342/70 |
| 2018/0198202 A1* | 7/2018 | Shor ........................ | H01Q 1/48 |
| 2018/0224536 A1* | 8/2018 | Wang ...................... | G01S 7/354 |
| 2019/0082302 A1* | 3/2019 | Swanson .............. | H04B 1/0039 |
| 2019/0366965 A1* | 12/2019 | Ben Khadhra ......... | G01S 7/025 |
| 2020/0373681 A1* | 11/2020 | Rojanski ................ | H01Q 1/246 |

* cited by examiner

*Primary Examiner* — Timothy X Pham
(74) *Attorney, Agent, or Firm* — Cantor Colburn LLP

(57) ABSTRACT

Systems and methods involve transmitting both horizontal and vertical polarizations from a radar system. A method includes receiving, using a first antenna of the radar system, first reflected signals with horizontal polarization, and receiving, using a second antenna of the radar system, second reflected signals with vertical polarization. The first reflected signals and the second reflected signals are processed together to obtain one or more angles to respective one or more objects detected by the radar system.

14 Claims, 3 Drawing Sheets

HORIZONTAL AND VERTICAL POLARIZATION BEAMFORMING IN A RADAR SYSTEM

INTRODUCTION

The subject disclosure relates to horizontal and vertical polarization beamforming in a radar system.

Vehicles (e.g., automobiles, trucks, construction equipment, farm equipment, automated factory equipment) are increasingly outfitted with sensors to provide information about the vehicle and its surroundings. Exemplary sensors include a radio detection and ranging (radar) system, a light detection and ranging (lidar) system, and a camera. A radar system, for example, involves the transmission of a radio frequency (RF) signal and reception of reflections of that signal by one or more objects in the field of view of the radar system. Processing of the reflections provides a range and angle to each object and may also provide relative range rate (i.e., Doppler). A fast Fourier transform (FFT) may be used to determine the range while a beamforming process may be used to determine the angle. Typically, radar systems in vehicles use vertical polarization. Accordingly, it is desirable to provide horizontal and vertical polarization beamforming in a radar system.

SUMMARY

In one exemplary embodiment, a method includes transmitting both horizontal and vertical polarizations from a radar system, and receiving, using a first antenna of the radar system, first reflected signals with horizontal polarization. The method also includes receiving, using a second antenna of the radar system, second reflected signals with vertical polarization. The first reflected signals and the second reflected signals are processed together to obtain one or more angles to respective one or more objects detected by the radar system.

In addition to one or more of the features described herein, the transmitting both the horizontal and the vertical polarizations includes transmitting a combined signal resulting from feeding a signal both horizontally and vertically to an antenna for transmission.

In addition to one or more of the features described herein, the transmitting both the horizontal and the vertical polarizations includes transmitting one signal with horizontal polarization and one signal with vertical polarization.

In addition to one or more of the features described herein, the receiving the first reflected signals and the receiving the second reflected signals includes respectively receiving:

$$y_h = \Sigma_{m=0}^M \alpha(\theta_m)\beta_m, \text{ and}$$

$$y_v = \Sigma_{m=0}^M \alpha(\theta_m)\gamma_m, \text{ where}$$

M is a number of the first reflected signals and the second reflected signals, $\alpha(\theta_m)$ is an array response vector to angle of arrival $\theta_m$, and $\beta_m$ and $\gamma_m$ are reflection coefficients.

In addition to one or more of the features described herein, the processing the first reflected signals and the second reflected signals includes performing beamforming to obtain a likelihood indicator $P(\theta)$ as:

$$P(\theta) = \|w_\theta^H y_v + w_\theta^H y_h\|^2,$$

$$w_\theta = \text{argmin}_w \|w_\theta^H y_v + w_\theta^H y_h\|^2, \text{ and}$$

$$w_\theta^H \alpha(\theta) = 1, \text{ where}$$

H indicates a conjugate transpose.

In addition to one or more of the features described herein, the processing the first reflected signals and the second reflected signals includes performing beamforming to obtain a likelihood indicator $P(\theta)$ as:

$$P(\theta) = \frac{1}{a^H(\theta)(R + \sigma I)^{-1} a(\theta)},$$

where
R is a sum of autocorrelations of the first reflected signals and the receiving the second reflected signals, a is a regularization factor, I is an identity matrix, and H indicates a conjugate transpose.

In addition to one or more of the features described herein, the R is given by:

$$R = y_v y_v^H + y_h y_h^H.$$

In addition to one or more of the features described herein, the method also includes selecting a value of the regularization factor $\sigma$.

In addition to one or more of the features described herein, the obtaining the one or more angles includes applying a detection threshold to the likelihood indicator $P(\theta)$.

In addition to one or more of the features described herein, the method also includes locating the radar system in a vehicle.

In another exemplary embodiment, a radar system transmits both horizontal and vertical polarizations, to receive first reflected signals with horizontal polarization and to receive second reflected signals with vertical polarization. A processor processes the first reflected signals and the second reflected signals together to obtain one or more angles to respective one or more objects detected by the radar system.

In addition to one or more of the features described herein, the radar system is configured to transmit a combined signal with both the horizontal and the vertical polarizations based on feeding a signal both horizontally and vertically to an antenna for transmission.

In addition to one or more of the features described herein, the radar system is configured to transmit one signal with horizontal polarization and one signal with vertical polarization in order to transmit both the horizontal and the vertical polarizations.

In addition to one or more of the features described herein, the first reflected signals and the second reflected signals are respectively given by:

$$y_h = \Sigma_{m=0}^M \alpha(\theta_m)\beta_m, \text{ and}$$

$$y_v = \Sigma_{m=0}^M \alpha(\theta_m)\gamma_m, \text{ and}$$

M is a number of the first reflected signals and the second reflected signals, $\alpha(\theta_m)$ is an array response vector, and $\beta_m$ and $\gamma_m$ are reflection coefficients.

In addition to one or more of the features described herein, the processor is configured to perform beamforming to obtain a likelihood indicator $P(\theta)$ as:

$$P(\theta) = \|w_\theta^H y_v + w_\theta^H y_h\|^2,$$

$$w_\theta = \text{argmin}_w \|w_\theta^H y_v + w_\theta^H y_h\|^2, \text{ and}$$

$$w_\theta^H \alpha(\theta) = 1, \text{ where}$$

H indicates a conjugate transpose.

In addition to one or more of the features described herein, the processor is configured to perform beamforming to obtain a likelihood indicator P(θ) as:

$$P(\theta) = \frac{1}{a^H(\theta)(R+\sigma I)^{-1}a(\theta)},$$

where
R is a sum of autocorrelations of the first reflected signals and the receiving the second reflected signals, σ is a regularization factor, I is an identity matrix, and H indicates a conjugate transpose.

In addition to one or more of the features described herein, the R is given by:

$$R = y_v y_v^H + y_h y_h^H.$$

In addition to one or more of the features described herein, the regularization factor σ is a selected value.

In addition to one or more of the features described herein, the processor is configured to obtain the one or more angles by applying a detection threshold to the likelihood indicator P(θ).

In addition to one or more of the features described herein, the radar system is in a vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
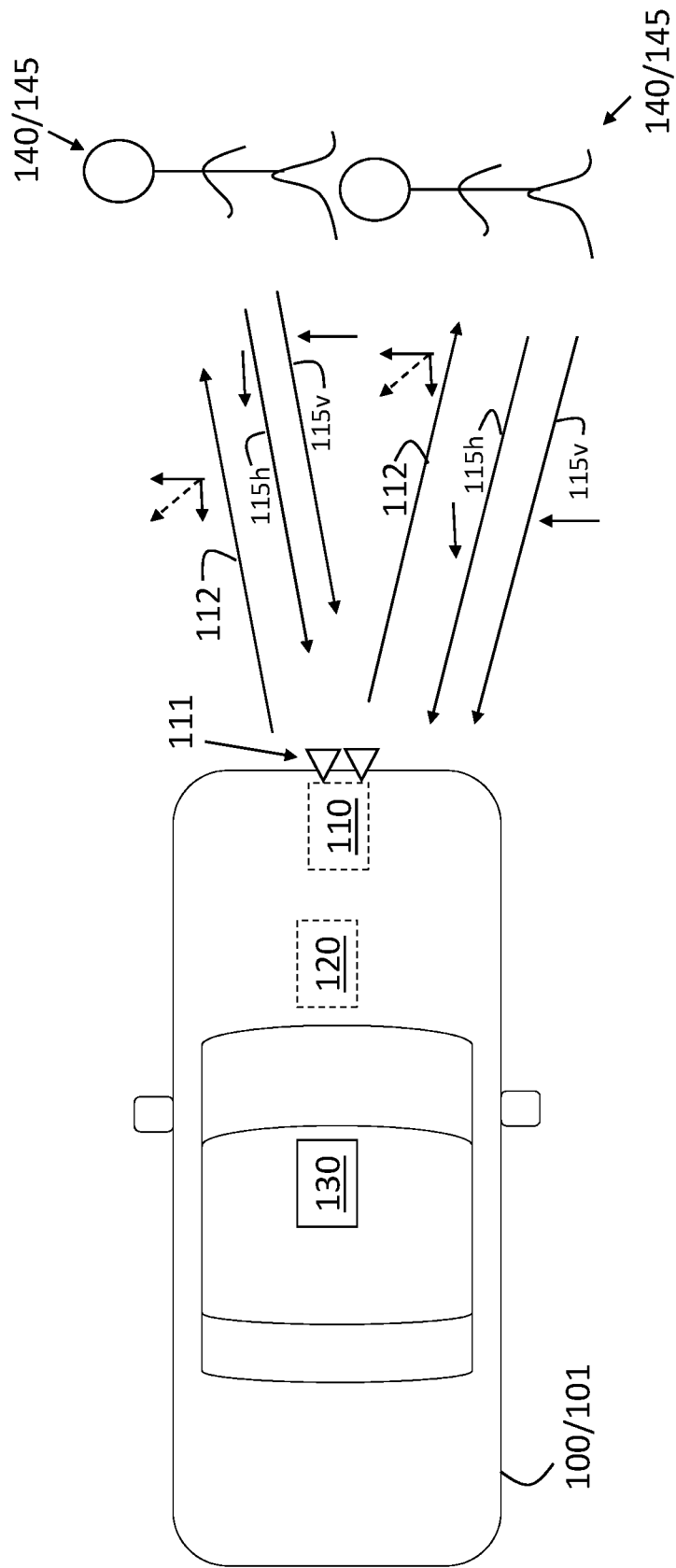
FIG. 1 is a block diagram of a vehicle that benefits from object detection using horizontal and vertical polarization beamforming in a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system is among the sensors that may be used to obtain information about an environment (e.g., objects in the vicinity) of a vehicle. The information obtained by the radar system may be used to control aspects of vehicle operation (e.g., collision avoidance, adaptive cruise control, automated braking) under an autonomous or semi-autonomous control scheme. As also noted, RF signals with vertical polarization are generally used. Polarization of the RF signal transmitted by a radar system is controlled by the way that the RF signal is fed to the transmitting antenna. For example, when the signal is fed to the antenna laterally (from left to right or right to left), horizontal polarization is achieved. When the signal is fed to the antenna from top to bottom or bottom to top, vertical polarization is achieved. In addition to horizontal or vertical polarization, a transmitted RF signal may have both horizontal and vertical polarization. This is achieved by feeding the RF signal both horizontally and vertically to the antenna. The intensity of the RF signal in each direction need not be, but can be, equal. Embodiments of the systems and methods detailed herein relate to horizontal and vertical polarization beamforming in a radar system. By transmitting and receiving both horizontal and vertical polarizations, the beamforming according to one or more embodiments results in increased angular resolution when compared to traditional beamforming using a single polarization.

In accordance with an exemplary embodiment, FIG. 1 is a block diagram of a vehicle 100 that benefits from object detection using horizontal and vertical polarization beamforming in a radar system 110. The exemplary vehicle 100 shown in FIG. 1 is an automobile 101. The radar system 110 may be a multi-input multi-output (MIMO) system with multiple transmit and multiple receive antenna elements. In addition to the radar system 110, the vehicle 100 may include additional sensors 130 (e.g., lidar system, camera). A controller 120 may control aspects of the operation of the vehicle 100 using information from the radar system 110 and/or other sensors 130.

The radar system 110 emits transmit signals 112 that have both horizontal and vertical polarization, as indicated. As previously noted, polarization of the emitted transmit signal 112 is based on the orientation with which the signal is fed to the antenna of the radar system 110. When the signal is fed both laterally and vertically, the transmit signal 112 with 45 degree polarization, as indicated by the dashed line, may be produced. When the transmit signal 112 with both horizontal and vertical polarization encounters an object 140, the result is a reflected signal 115h with horizontal polarization and a reflected signal 115v with vertical polarization (generally referred to as reflected signals 115) reflected back to the radar system 110.

Two exemplary antennas 111 are shown for the radar system 110. However, the antennas 111 that transmit and receive may be separate (i.e., the radar system 110 may not use a transceiver arrangement) and separate antennas 111 may receive the reflected signal with horizontal polarization 115h and the reflected signal with vertical polarization 115v. The spacing among antennas 111 that receive reflected signals 115h with horizontal polarization and the spacing among antennas 111 that receive reflected signals 115v with vertical polarization is assumed to be the same. Thus, if the two exemplary antennas 111 shown in FIG. 1 receive reflected signals 115h with horizontal polarization, two antennas 111 that receive reflected signals 115v with vertical polarization may be directly below or above the antennas 111 that are shown. The two antennas 111 that receive reflected signals 115h with horizontal polarization may be beside the two antennas 111 that receive reflected signals 115v with vertical polarization, as another example. As previously noted, the relevant aspect of the arrangement is that the two antennas that receive reflected signals 115h with horizontal polarization are separated by the same amount as the two antennas 111 that receive reflected signals 115v with vertical polarization.

The two exemplary objects 140 shown in FIG. 1 are pedestrians 145. Angular resolution refers to accurately discerning the angle of arrival of reflected signals 115 from one of the pedestrians 145 from the angle of arrival of reflected signals 115 from the other pedestrian 145. The processing of reflected signals 115 received by the radar system 110 may be performed within the radar system 110, by the controller 120, or a combination of the two. The processing, whether in the radar system 110 or controller 120, involves processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
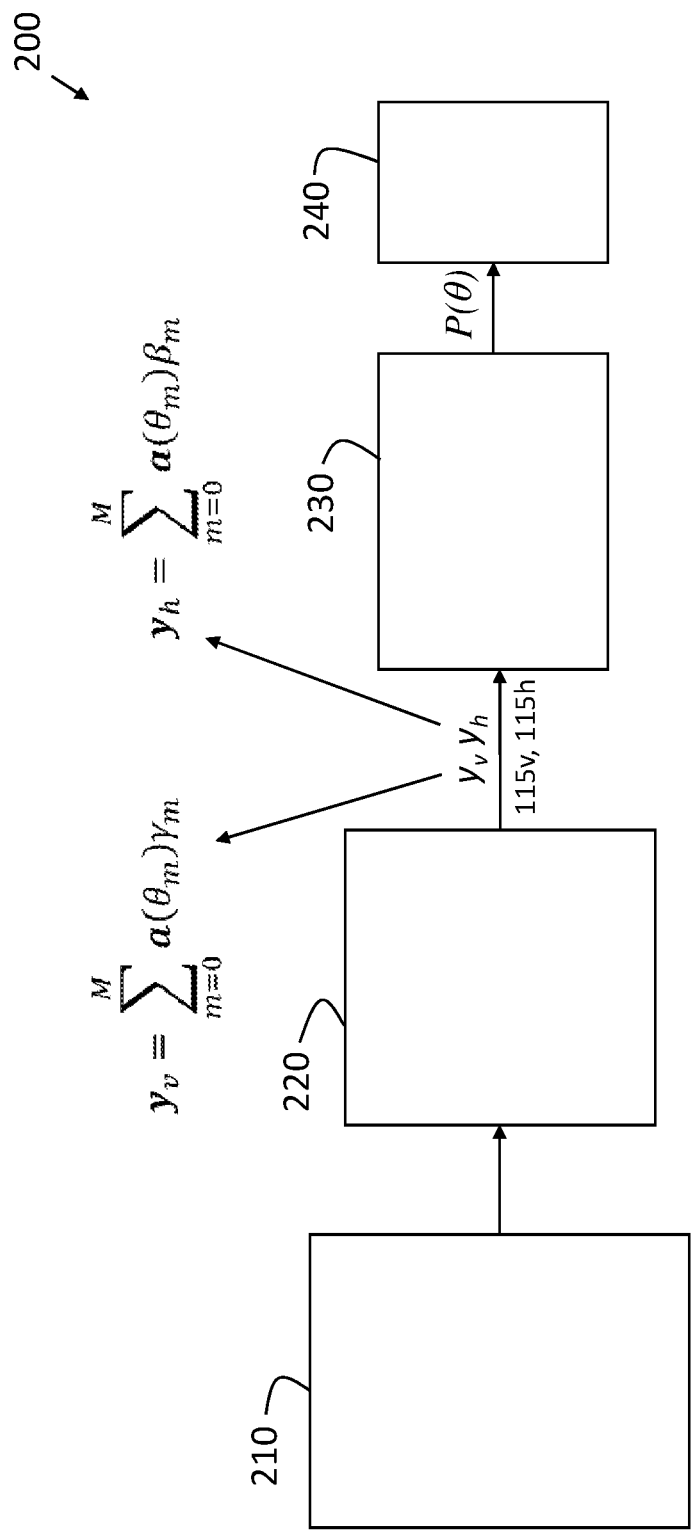
FIG. 2 is a process flow of a method of using horizontal and vertical polarization beamforming in a radar system according to one or more embodiments.

FIG. 2 is a process flow of a method 200 of using horizontal and vertical polarization beamforming in a radar system 110 according to one or more embodiments. At block 210, transmitting a transmit signal 112 with horizontal and vertical polarization may include transmitting separate horizontal and vertical polarization signals or transmitting both together as a 45 degree signal. Transmitting horizontal and vertical polarization transmit signals 112 separately may be done using different antennas 111 for each. Alternately, as previously noted, by feeding the signal to the antenna 111 both horizontally and vertically, a transmit signal 112 with both horizontal and vertical polarization may be emitted.

At block 220, receiving reflected signals 115 includes receiving both reflected signals 115h with horizontal polarization and reflected signals 115v with vertical polarization using different antennas 111. To be clear, while a transmit signal 112 with both horizontal and vertical polarization may be transmitted by one antenna 111 according to an exemplary embodiment, two separate antennas 111 are used to respectively obtain reflected signals 115h with horizontal polarization and reflected signals 115v with vertical polarization. As shown in FIG. 2, the reflected signals 115h with horizontal polarization and reflected signals 115v with vertical polarization are referred to and represented, respectively, as $y_v$ and $y_h$.

Specifically:

$$y_v = \Sigma_{m=0}^{M} \alpha(\theta_m) \gamma_m \quad [\text{EQ. 1}]$$

$$y_h = \Sigma_{m=0}^{M} \alpha(\theta_m) \beta_m \quad [\text{EQ. 2}]$$

In EQS. 1 and 2, M is the number of reflected signals 115. As EQS. 1 and 2 indicate, the array response vector $\alpha(\theta_m)$ for an angle of arrival $\theta_m$ is the same for both the reflected signals 115h with horizontal polarization and reflected signals 115v with vertical polarization. This is because, as previously noted, the spacing among antennas 111 that receive the reflected signals 115h with horizontal polarization and the spacing among antennas 111 that receive the reflected signals 115v with vertical polarization is assumed to be the same. Specifically:

$$a(\theta) = \left[ e^{\frac{j2\pi x_0 \sin(\theta)}{\lambda}} \; e^{\frac{j2\pi x_1 \sin(\theta)}{\lambda}} \; \ldots \; e^{\frac{j2\pi x_i \sin(\theta)}{\lambda}} \right]^T \quad [\text{EQ. 3}]$$

In EQ. 3, $x_i$ indicates the position of the antenna 111 within the MIMO array and $\lambda$ is the wavelength of the transmit signal 112.

In EQS. 1 and 2, the reflection coefficients $\beta_m$ for the reflected signals 115h with horizontal polarization differ from the reflection coefficients $\gamma_m$ of the reflected signals 115v with vertical polarization. That is, each polarized antenna 111 is a superposition of the same steering vectors $\alpha(\theta_m)$ but with different reflection coefficients. Thus, the approach of transmitting both horizontal and vertical polarizations results in two independent realizations. These independent realizations facilitate increased angular resolution based on applying a beamforming method, according to one or more embodiments, at block 230.

At block 230, performing beamforming refers to determining a likelihood value for each angle $\theta$ using both the reflected signals 115h with horizontal polarization and reflected signals 115v with vertical polarization or $y_v$ and $y_h$. Specifically:

$$P(\theta) = \|w_\theta^H y_v + w_\theta^H y_h\|^w \quad [\text{EQ. 4}]$$

$$w_\theta = \text{argmin}_w \|w_\theta^H y_v + w_\theta^H y_h\|^2 \quad [\text{EQ. 5}]$$

The "H" indicates a conjugate transpose. A constraint on the solution to EQ. 5 is that:

$$w_\theta^H \alpha(\theta) = 1 \quad [\text{EQ. 6}]$$

Based on EQS. 4 and 5:

$$P(\theta) = \frac{1}{a^H(\theta)(R + \sigma I)^{-1} a(\theta)} \quad [\text{EQ. 7}]$$

$$R = y_v y_v^H + y_h y_h^H \quad [\text{EQ. 8}]$$

As EQ. 8 indicates, R is the sum of the autocorrelations of the reflected signals 115h with horizontal polarization and reflected signals 115v with vertical polarization or $y_v$ and $y_h$.

In EQ. 7, $\sigma$ is the regularization factor, and I is an identity matrix. The regularization factor $\sigma$ is selected based on a tradeoff between accuracy and robustness to uncertainty in $\alpha(\theta)$ and R. That is, when the regularization factor $\sigma$ is set at 0, there is no regularization. When the regularization factor $\sigma$ is set to the maximum eigenvalue of R, the most robust but least accurate likelihood $P(\theta)$ is obtained. At block 240, finding the peaks refers to finding the one or more values of $\theta$ for which the likelihood $P(\theta)$ is highest (e.g., over a defined detection threshold value). These one or more values of $\theta$ are the respective estimated angles of one or more objects 140 relative to the radar system 110.

Figure 3:
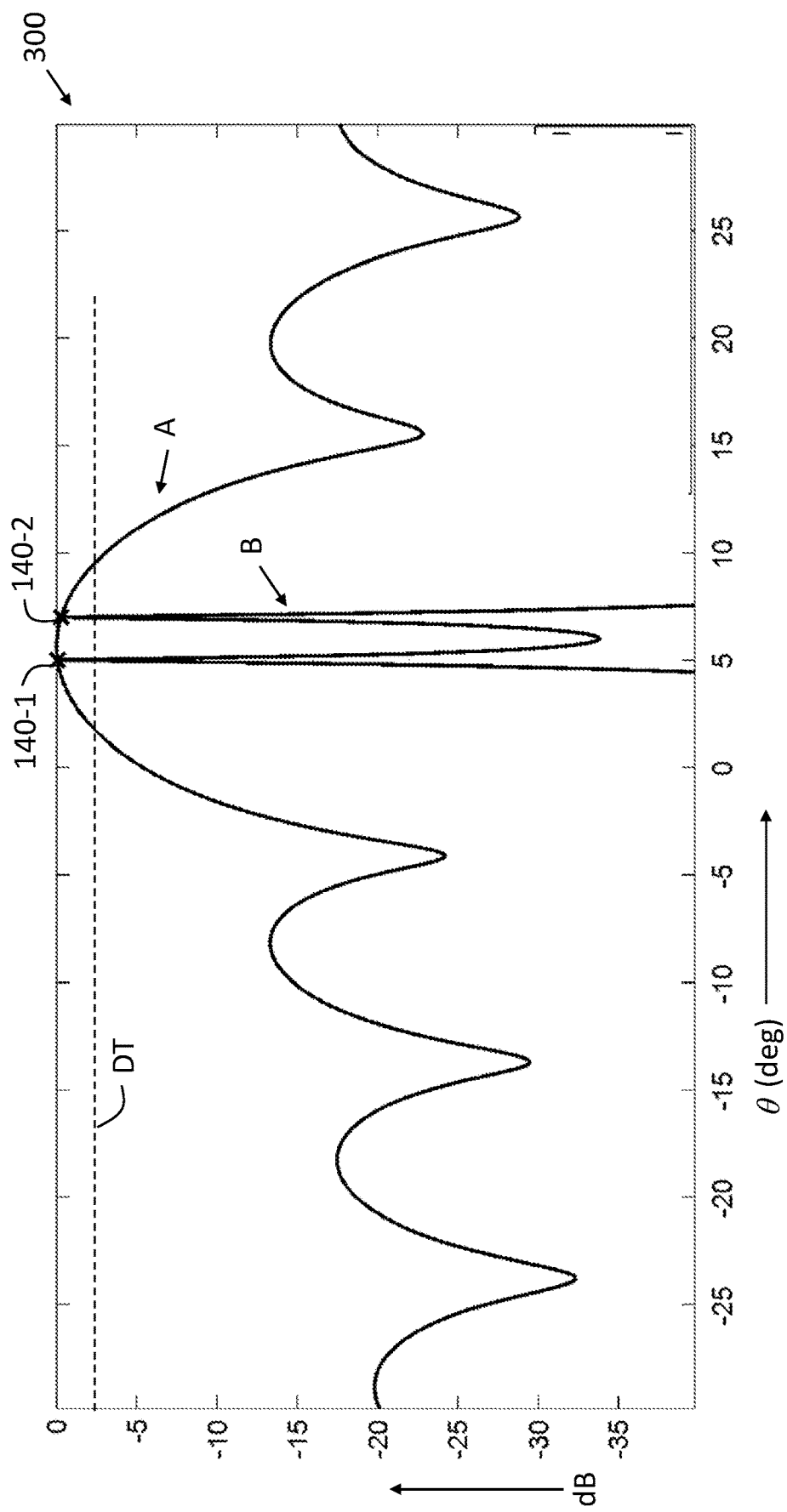
FIG. 3 illustrates beamforming results for comparison of horizontal and vertical polarization beamforming according to one or more embodiments with single-polarization beamforming according to conventional approaches.

FIG. 3 illustrates beamforming results 300 for comparison of horizontal and vertical polarization beamforming according to one or more embodiments with single-polarization beamforming according to conventional approaches. As indicated, azimuth ($\theta$) in degrees (deg) is indicated along one axis, and signal strength in decibels (dB) is indicated along another, perpendicular axis. The beamforming result A is based on conventional beamforming that uses transmissions and reflections with a single polarization. The beamforming result B is based on transmit signals 112 that include both horizontal and vertical polarization and reflected signals 115h with horizontal polarization and reflected signals 115v with vertical polarization. The beamforming result B is $P(\theta)$. In fact, both beamforming results A and B indicate likelihood for the various azimuth angles. An exemplary detection threshold (DT) is shown. Angles for which the beamforming result A or B exceeds the DT may be regarded as relative angles of detected objects 140.

As FIG. 3 indicates, two exemplary objects 140-1 and 140-2 result in two distinct peaks in the beamforming result B, which is obtained using horizontal and vertical polarization. As indicated, the angle to object 140-1 is 5 degrees, and the angle to object 140-2 is 7 degrees. On the other hand, the beamforming result A, which is obtained with a single polarization, does not clearly show that two objects 140 are present. In fact, it may appear that the angle to one object 140 was detected over a spread of angles.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method, comprising:
   transmitting both horizontal and vertical polarizations from a radar system;
   receiving, using a first antenna of the radar system, first reflected signals with horizontal polarization;
   receiving, using a second antenna of the radar system, second reflected signals with vertical polarization;
   processing the first reflected signals and the second reflected signals together to obtain one or more azimuth angles to respective one or more objects from the radar system, the one or more angles being obtained by performing processes including beamforming using the first reflected signals and the second reflected signals, wherein the receiving the first reflected signals and the receiving the second reflected signals includes respectively receiving:

$y_h = \sum_{m=0}^{M} \alpha(\theta_m)\beta_m$, and $y_v = \sum_{m=0}^{M} \alpha(\theta_m)\gamma_m$, where M is a number of the first reflected signals and the second reflected signals, $\alpha(\theta_m)$ is an array response vector to angle of arrival $\theta_m$, and $\beta_m$ and $\gamma_m$ are reflection coefficients, and
   the processing the first reflected signals and the second reflected signals includes performing the beamforming to obtain a likelihood indicator $P(\theta)$ as:

$P(\theta) = \|w_\theta^H y_v + w_\theta^H y_h\|^2$, $w_\theta = \text{argmin}_w \|w_\theta^H y_v + w_\theta^H y_h\|^2$, and $w_\theta^H \alpha(\theta) = 1$, where H indicates a conjugate transpose, or
   the processing the first reflected signals and the second reflected signals includes performing the beamforming to obtain a likelihood indicator $P(\theta)$ as:

$P(\theta) = \dfrac{1}{a^H(\theta)(R+\sigma I)^{-1}a(\theta)}$, where
   R is a sum of autocorrelations of the first reflected signals and the receiving the second reflected signals, $\sigma$ is a regularization factor, I is an identity matrix, and H indicates a conjugate transpose.

2. The method according to claim 1, wherein the transmitting both the horizontal and the vertical polarizations includes transmitting a combined signal resulting from feeding a signal both horizontally and vertically to an antenna for transmission.

3. The method according to claim 1, wherein the transmitting both the horizontal and the vertical polarizations includes transmitting one signal with horizontal polarization and one signal with vertical polarization.

4. The method according to claim 1, wherein the R is given by:

$R = y_v y_v^H + y_h y_h^H$.

5. The method according to claim 1, further comprising selecting a value of the regularization factor $\sigma$.

6. The method according to claim 1, wherein the obtaining the one or more angles includes applying a detection threshold to the likelihood indicator $P(\theta)$.

7. The method according to claim 1, further comprising locating the radar system in a vehicle.

8. A system, comprising:
   a radar system configured to transmit both horizontal and vertical polarizations, to receive first reflected signals with horizontal polarization and to receive second reflected signals with vertical polarization; and
   a processor configured to process the first reflected signals and the second reflected signals together to obtain one or more azimuth angles to respective one or more objects from the radar system, the processor being configured to obtain the one or more angles by performing processes including beamforming using the first reflected signals and the second reflected signals, wherein the first reflected signals and the second reflected signals are given by:

$y_h = \sum_{m=0}^{M} \alpha(\theta_m)\beta_m$, and $y_v = \sum_{m=0}^{M} \alpha(\theta_m)\gamma_m$, where M is a number of the first reflected signals and the second reflected signals, $\alpha(\theta_m)$ is an array response vector to angle of arrival $\theta_m$, and $\beta_m$ and $\gamma_m$ are reflection coefficients, and
   the processor is configured to perform the beamforming to obtain a likelihood indicator $P(\theta)$ as:

$P(\theta) = \|w_\theta^H y_v + w_\theta^H y_h\|^2$, $w_\theta = \text{argmin}_w \|w_\theta^H y_v + w_\theta^H y_h\|^2$, and $w_\theta^H \alpha(\theta) = 1$, where H indicates a conjugate transpose, or
   the processor is configured to perform the beamforming to obtain a likelihood indicator $P(\theta)$ as:

$P(\theta) = \dfrac{1}{a^H(\theta)(R+\sigma I)^{-1}a(\theta)}$, where
   R is a sum of autocorrelations of the first reflected signals and the receiving the second reflected signals, $\sigma$ is a regularization factor, I is an identity matrix, and H indicates a conjugate transpose.

9. The system according to claim 8, wherein the radar system is configured to transmit a combined signal with both the horizontal and the vertical polarizations based on feeding a signal both horizontally and vertically to an antenna for transmission.

10. The system according to claim 8, wherein the radar system is configured to transmit one signal with horizontal polarization and one signal with vertical polarization in order to transmit both the horizontal and the vertical polarizations.

11. The system according to claim 8, wherein the R is given by:

$R = y_v y_v^H + y_h y_h^H$.

12. The system according to claim 8, wherein the regularization factor σ is a selected value.

13. The system according to claim 8, wherein the processor is configured to obtain the one or more angles by applying a detection threshold to the likelihood indicator $P(\theta)$.

14. The system according to claim 8, wherein the radar system is in a vehicle.

* * * * *